US009630093B2

(12) United States Patent
Pope et al.

(10) Patent No.: US 9,630,093 B2
(45) Date of Patent: Apr. 25, 2017

(54) METHOD AND SYSTEM FOR PHYSIOLOGICALLY MODULATING VIDEOGAMES AND SIMULATIONS WHICH USE GESTURE AND BODY IMAGE SENSING CONTROL INPUT DEVICES

(71) Applicant: The United States of America as represented by the Administrator of the National Aeronautics and Space Administration, Washington, DC (US)

(72) Inventors: Alan T. Pope, Poquoson, VA (US); Chad L. Stephens, Poquoson, VA (US); Tyler Habowski, Redmond, WA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 556 days.

(21) Appl. No.: 13/836,609

(22) Filed: Mar. 15, 2013

(65) Prior Publication Data
US 2015/0258429 A1 Sep. 17, 2015

Related U.S. Application Data

(60) Provisional application No. 61/663,039, filed on Jun. 22, 2012, provisional application No. 61/709,372, filed on Oct. 4, 2012.

(51) Int. Cl.
A63F 13/06 (2006.01)
A63F 13/20 (2014.01)
(Continued)

(52) U.S. Cl.
CPC .............. *A63F 13/06* (2013.01); *A63F 13/04* (2013.01); *A63F 13/212* (2014.09);
(Continued)

(58) Field of Classification Search
USPC ........................ 463/29, 30, 31, 32
See application file for complete search history.

(56) References Cited

U.S. PATENT DOCUMENTS 4,065,860 A  1/1978 Linton et al.
4,337,049 A  6/1982 Connelly
(Continued)

OTHER PUBLICATIONS

Azcarate, A., Hageloh, F., Van De Sande, K., Valenti. R., "Automatic Facial Emotion Recognition," Universiteit van Amsterdam, Netherlands, 2005. Vision and Image Understanding, vol. 61, No. 1. 1995, pp. 38-59.

(Continued)

*Primary Examiner* — Paul A D'Agostino
*Assistant Examiner* — Brandon Gray
(74) *Attorney, Agent, or Firm* — Jennifer L. Riley; Jonathan B. Soike (57) ABSTRACT

Method for physiologically modulating videogames and simulations includes utilizing input from a motion-sensing video game system and input from a physiological signal acquisition device. The inputs from the physiological signal sensors are utilized to change the response of a user's avatar to inputs from the motion-sensing sensors. The motion-sensing system comprises a 3D sensor system having full-body 3D motion capture of a user's body. This arrangement encourages health-enhancing physiological self-regulation skills or therapeutic amplification of healthful physiological characteristics. The system provides increased motivation for users to utilize biofeedback as may be desired for treatment of various conditions.

34 Claims, 3 Drawing Sheets

(51) Int. Cl.
*A63F 13/219* (2014.01)
*A63F 13/213* (2014.01)
*A63F 13/42* (2014.01)
*A63F 13/212* (2014.01)

(52) U.S. Cl.
CPC .......... *A63F 13/213* (2014.09); *A63F 13/219* (2014.09); *A63F 13/42* (2014.09)

(56) References Cited

U.S. PATENT DOCUMENTS

| | | | |
|---|---|---|---|
| 4,508,510 | A | 4/1985 | Clifford |
| 5,377,100 | A | 12/1994 | Pope et al. |
| 5,626,140 | A | 5/1997 | Feldman et al. |
| 5,697,791 | A | 12/1997 | Nashner et al. |
| 5,702,323 | A | 12/1997 | Poulton |
| 5,743,744 | A | 4/1998 | Cassily et al. |
| 5,907,819 | A | 5/1999 | Johnson |
| 5,947,868 | A | 9/1999 | Dugan |
| 5,984,684 | A | 11/1999 | Brostedt et al. |
| 6,038,534 | A * | 3/2000 | Richards ................. 704/275 |
| 6,067,468 | A | 5/2000 | Korenman et al. |
| 6,093,146 | A | 7/2000 | Filangeri |
| 6,126,449 | A | 10/2000 | Burns |
| 6,132,337 | A | 10/2000 | Krupka et al. |
| 6,212,427 | B1 | 4/2001 | Hoover |
| 6,259,889 | B1 | 7/2001 | LaDue |
| 6,261,189 | B1 | 7/2001 | Saville et al. |
| 6,277,030 | B1 | 8/2001 | Baynton et al. |
| 6,425,764 | B1 | 7/2002 | Lamson |
| 6,450,820 | B1 | 9/2002 | Palsson et al. |
| 6,463,385 | B1 | 10/2002 | Fry |
| 6,491,647 | B1 | 12/2002 | Bridger et al. |
| 6,527,700 | B1 | 3/2003 | Manico et al. |
| 6,682,351 | B1 | 1/2004 | Abraham-Fuchs et al. |
| 6,774,885 | B1 | 8/2004 | Even-Zohar |
| 6,778,866 | B1 | 8/2004 | Bettwy |
| 6,786,730 | B2 | 9/2004 | Bleckley et al. |
| 6,935,954 | B2 | 8/2005 | Sterchi et al. |
| 7,331,870 | B2 | 2/2008 | Smith et al. |
| 7,737,944 | B2 | 6/2010 | Harrison et al. |
| 7,782,297 | B2 | 8/2010 | Zalewski et al. |
| 8,062,129 | B2 | 11/2011 | Pope et al. |
| 8,116,841 | B2 | 2/2012 | Bly et al. |
| 2003/0013071 | A1 | 1/2003 | Thomas |
| 2003/0013072 | A1 | 1/2003 | Thomas |
| 2003/0087220 | A1 | 5/2003 | Bessette |
| 2005/0014113 | A1 | 1/2005 | Fleck et al. |
| 2007/0060384 | A1 | 3/2007 | Dohta |
| 2007/0118043 | A1 | 5/2007 | Oliver et al. |
| 2008/0291160 | A1 | 11/2008 | Rabin |
| 2009/0029754 | A1 | 1/2009 | Slocum et al. |
| 2010/0303291 | A1 * | 12/2010 | Margolis .................. 382/103 |
| 2011/0009193 | A1 | 1/2011 | Bond et al. |
| 2011/0298827 | A1 * | 12/2011 | Perez .................. 345/647 |
| 2011/0300523 | A1 | 12/2011 | Pope et al. |
| 2012/0004034 | A1 | 1/2012 | Pope et al. |
| 2012/0142429 | A1 * | 6/2012 | Muller .................. 463/42 |

OTHER PUBLICATIONS

Dinges, D.E. et al., "Optical Computer Recognition of Facial Expressions Associated with Stress Induced by Performance Demands," Aviation, Space, and Environmental Medicine, vol. 76, No. 6, Section 11, 2005, pp. B172-B182.

Lerner, J.S., Dahl, R.E., Hariri, A.R., Taylor, S. E., "Facial Expressions of Emotions Reveal Neuroendocrine and Cardiovascular Stress Responses," Biological Psychiatry, vol. 61, No. 2, 2007, pp. 253-260.

Ratliff, M. S., Patterson, E., "Emotion Recognition Using Facial Expressions with Active Appearance Models," Third IASTED International Conference on Human Computer Interaction, Understanding Users, 2005, pp. 138-143.

Keltner D., Ekman P., Facial Expressions of Emotion, Handbook of Emotions, 2nd ed., edited by M. Lewis and J. Haviland-Jones, Guilford Publications, Inc., New York, 2000, pp. 236-245.

Pope, Alan T., et al., "Biocybemetic System Evaluates Indices of Operator Engagement in Automated Task," Biological Psychology, 1995, vol. 40, pp. 187-195.

Roco, Mihail C. et el. "Converging Technologies for Improving Human Performance, Nanotechnology. Biotechnology, Information Technology and Cognitive Science," National Science Foundation/DOC Sponsored Report, 2003, pp. 261-269.

Pope, Alan T., "Morohing Beyond Recognition: The Future of Biofeedback Technologies", Biofeedback, Spring 2002, vol. 30 No. 1, pp. 14-15.

Pope, Alan T., "Helping Videogsmes Rewire Our Minds", NASA TM/-2004-0086464, 2004.

* cited by examiner

METHOD AND SYSTEM FOR PHYSIOLOGICALLY MODULATING VIDEOGAMES AND SIMULATIONS WHICH USE GESTURE AND BODY IMAGE SENSING CONTROL INPUT DEVICES

CROSS-REFERENCE TO RELATED APPLICATIONS

The present application claims the benefit of U.S. Provisional Application No. 61/663,039 filed on Jun. 22, 2012, entitled "Method and System for Physiologically Modulating Videogames and Simulations Which Use Gesture and Body Image Sensing Control Input Devices", and of U.S. Provisional Application No. 61/709,372 filed on Oct. 4, 2012, entitled "Method and System for Physiologically Modulating Action Role-playing Open World Video Games and Simulations Which Use Gesture and Body Image Sensing Control Input Devices," the entire contents of both applications are incorporated herein by reference in their entirely.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

FIELD OF THE INVENTION

The present invention relates to an apparatus and method for physiologically modulating video games and simulations, and in particular to a method and system that utilizes wireless motion-sensing technology to modulate a player's movement inputs to the video game or simulation based upon physiological signals.

BACKGROUND OF THE INVENTION

Game controllers have been developed that allow a player to make inputs to a video game or simulation by gesturing and/or by moving the player's body. The Microsoft® "Kinect"® motion-sensing videogame technology employs camera image analysis methods. In this technology, cameras sense the player's image.

Physiologically modulated videogames add to the entertainment value of videogames by adding the challenge of requiring a player to master physiological self-regulation skill as well as hand-eye coordination. Thus, controlling the physiological state, or learning to self-induce physiologic changes, is an additional skill requirement or challenge added to games.

In addition to enhancing entertainment value by making games more exciting, physiologically modulated videogames also have advantages for encouraging health-enhancing physiological self-regulation skills or for therapeutic amplification of healthful physiological characteristics. Biofeedback, an effective treatment for various physiological problems, can be used to optimize physiological functioning in many ways. The benefits of biofeedback can, however, only be attained through a number of training sessions, and such gains can only be maintained over time through regular practice. Adherence to regular training, especially at home, has been a problem that has plagued the field of biofeedback and limited its utility to date. The inventions disclosed in U.S. Pat. No. 5,377,100, Method of Encouraging Attention by Correlating Video Game Difficulty with Attention Level, Pope et al., Dec. 27, 1994; U.S. Pat. No. 6,450,820, Method and Apparatus for Physiological Self-Regulation Through Modulation of an Operator's Control Input to a Video Game or Training Simulator, Palsson et al., Sep. 17, 2002; and U.S. Pat. No. 8,062,129, Physiological User Interface for a Multi-User Virtual Environment, Pope et al, Nov. 22, 2011, have solved this to a degree, by blending biofeedback into video games, which increases motivation. The entire contents of U.S. Pat. Nos. 5,377,100, 6,450,820, and 8,062,129 are hereby incorporated by reference.

Biofeedback-modulated video games or simulations of U.S. Pat. Nos. 5,377,100, 6,450,820 and 8,062,129, are games that respond to physiological signals as well as mouse, joystick or game controller input; they embody the concept of improving physiological functioning by rewarding specific healthy body signals with success at playing a video game. The biofeedback-modulated game method of these patents blends biofeedback into commercially available off-the-shelf video games in such a way that the games do not lose their entertainment value. This method uses physiological signals (e.g. electroencephalogram frequency band ratio) not simply to drive a biofeedback display directly, or periodically modify a task as in other systems, but to continuously modulate parameters (e.g., game character speed and mobility) of a game task in real time while the game task is being performed by other means (e.g., a game controller).

BRIEF SUMMARY OF THE INVENTION

The present invention utilizes motion-sensing videogame technology that employs cameras and image analysis methods to sense a player's image. The motion sensing technology is utilized to provide an input to the system concerning the player's actual position and movements. The system also utilizes electroencephalographic (EEG) signal acquisition technology that derives signals representing psychological functions from EEG signals. The signals representing psychological functions are also utilized as an input in a system and method according to one aspect of the present invention. The present invention can also utilize an integrated EMG signal, and a heart rate (cardiotachometer) signal. Furthermore, the present invention can utilize brain wave indices, e.g., an "engagement index," derived from brainwave signals. Other physiological signals that can be used include, but are not limited to, skin conductance signals, skin temperature signals and respiration signals. Furthermore, a heart rate signal derived from a photoplethysmograph sensor or electrocardiogram electrodes can be utilized as an input. One way to obtain the electrocardiogram heart signal is the use of known chest band electrodes in combination with a wireless transmitter.

The degree of improvement in abilities of an avatar in the video game is programmed to be inversely proportional to the difference between the player's current momentary physiological signal value and a pre-selected target value. In this way, the player is rewarded for diminishing the difference by an improved avatar ability. This is referred to as a physiologically modulated advantage. Some game consequences reward the player for achieving a psychophysiological goal by diminishing an undesirable effect in the game (analogous to negative reinforcement). Other game consequences reward the player for achieving a psychophysiological goal by producing a desirable effect (analogous to positive reinforcement) such as additional scoring opportunities.

Various aspects of a player's avatar can be modified based on derived signals representing psychological functions. For example, the steadiness of a player's avatar can be made inversely proportional to the difference between the player's current momentary physiological signal value and a pre-selected target value. Also, the speed of an avatar's movements can be made inversely proportional to the difference between the player's current momentary physiological signal value and a pre-selected target value. Other aspects of the game such as the size, strength, and stealth of the avatar can also be made inversely proportional to a difference between the player's current momentary physiological signal value and a pre-selected target value. Other aspects of the game can also be controlled based upon a player's current momentary physiological signal value relative to a pre-selected target physiological signal value.

These and other features, advantages, and objects of the present invention will be further understood and appreciated by those skilled in the art by reference to the following specification, claims, and appended drawings.

DETAILED DESCRIPTION OF EMBODIMENTS

It is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
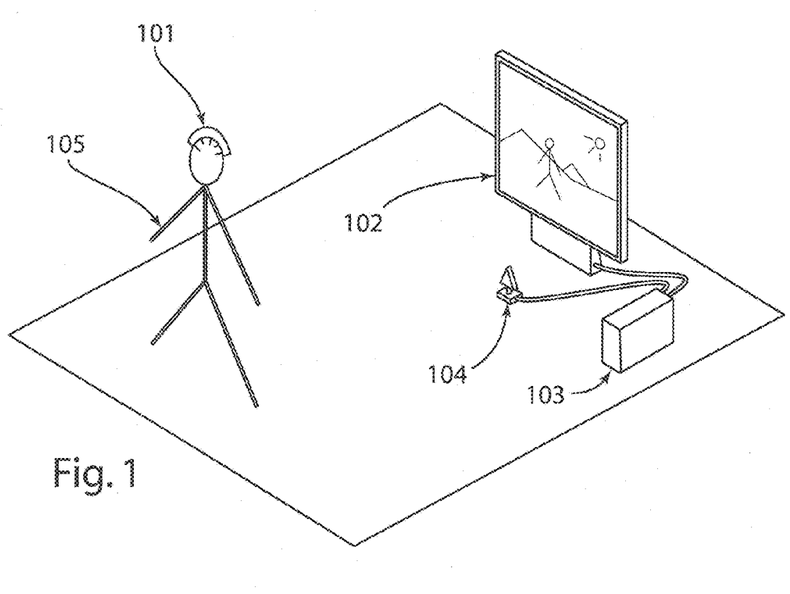
FIG. 1 is a partially schematic isometric view of a system according to one aspect of the present invention.

With reference to FIG. 1, a system according to one embodiment of the present invention includes a video display/TV screen 102, a controller 103, and a motion capture device 104. As discussed in more detail below, controller 103 and motion capture sensors 104 can comprise components of a commercially available Microsoft® Kinect® video game system. The system can be configured to provide games and/or simulations. The terms "game" and "simulation" can be used interchangeably herein, and these terms are therefore not to be construed in a restrictive manner. Physical actions performed by a user 105 are sensed in 3D by the motion capture system 104. This data is relayed to controller 103 where the software is running. Mental changes by the user 105 are sensed and registered by headset/sensors 101 and then relayed to controller 103 where they are interpreted and refined programmatically. The program running on controller 103 then combines these signals together and outputs a rendering of the virtual world and displays it on video display 102. Here, the user 105 can see what is happening in the game and how their actions and mental state are influencing the game environment.

Physiologically modulated videogames have increased entertainment value by making games more exciting and challenging. These games also have advantages of encouraging health-enhancing physiological self-regulation skills or for the therapeutic amplification of healthful physiological characteristics. The arrangement disclosed in U.S. Pat. Nos. 5,377,100 and 6,450,820 blends biofeedback into videogames, which increases motivation and provides an added dimension of entertaining challenge. The system disclosed in the U.S. Pat. No. '100 and U.S. Pat. No. '820 modulates (based on player physiological signals) the manual inputs that a player makes to the buttons or joysticks of a video game hand controller. However, the present game system can use a new type of commercially available game controller that allows a player to make inputs to a video game by moving the player's body or making gestures.

One aspect of the present invention is software that integrates physiological signal acquisition hardware and software (e.g. Emotiv® EPOC) and gesture and body movement sensing hardware and software (e.g. Kinect®), modulating the functioning of the gesture and body movement technology based upon characteristics of the physiological signals. The Microsoft® "Kinect®" motion-sensing videogame technology utilizes cameras that sense the player's image.

The present system modulates the functioning of gesture and body movement technology based upon characteristics of physiological signals acquired by physiological signal acquisition hardware and software.

A system according to one embodiment utilizes the Microsoft® Kinect® gesture and body movement technology and the Emotiv® EPOC electroencephalographic (EEG) signal acquisition technology. The Emotiv® EPOC neuro-signal acquisition and processing wireless headset is available from Emotiv® Systems, Inc. of San Francisco, Calif. The Emotiv® EPOC technology derives signals representing psychological functions from EEG signals. A system according to one embodiment uses signals representing "engagement/boredom," "frustration," "meditation," and "excitement" to modulate certain aspects of a demonstrative videogame involving player control of an avatar by gesture and body movement.

According to one embodiment the degree of improvement in abilities of an avatar in the video game is programmed to be inversely proportional to the difference between the player's current momentary physiological signal value and a pre-selected target value for the physiological signal. In this way, the player is rewarded for diminishing this difference by an improved avatar ability; this is termed a physiologically modulated advantage.

Some game consequences reward the player for achieving a psychophysiological goal by diminishing an undesirable effect in the game (analogous to negative reinforcement). Other game consequences reward the player for achieving a psychophysiological goal by producing a desirable effect (analogous to positive reinforcement) such as additional scoring opportunities as described in U.S. Pat. No. 8,062,129, and those described herein. That is, some modulation effects enable superimposed disadvantages in a digital game or simulation to be reduced by progression toward a psychophysiological goal, whereas others enable advantages to be effected by progression toward a psychophysiological goal.

A system according to a first embodiment effects the following modulations of Kinect® functions:

Steadiness: In game action requiring a player's avatar to exhibit fine motor control, as in aiming or targeting, the steadiness of the avatar's hand or arm is made inversely proportional to the difference between the player's current momentary physiological signal value and a pre-selected target value for the physiological signal. Unsteadiness is accomplished by programming a random disturbance, the amplitude of which is made proportional to the difference just described, to be superimposed on the avatar's response to the player's intentional movement sensed by the Kinect®.

Speed: The speed of an avatar's movements is made inversely proportional to the difference between the player's current momentary physiological signal value and a pre-selected target value for the physiological signal. This is accomplished by programming the correspondence, or gain ratio, between the extent of a player's movements and the extent of the avatar's movements to be inversely proportional to the difference between the player's current momentary physiological signal value and a pre-selected target value. Similarly, the gain ratio can be made directly proportional to the signal difference in game situations where fine motor movements of the avatar offer an advantage.

Snag: The ability of an avatar to grasp an object in the game environment is made inversely proportional to the difference between the player's current momentary physiological signal value and a pre-selected target value for the physiological signal.

Size: The size of an avatar in the game environment is made inversely proportional to the difference between the player's current momentary physiological signal value and a pre-selected target value for the physiological signal, allowing the avatar to navigate through environmental features of various dimensions. This is accomplished by programming a multiplier of the avatar's dimensions to be inversely proportional to the difference between the player's current momentary physiological signal value and a pre-selected target value for the physiological signal. Similarly, the avatar's size can be made to be directly proportional to the signal difference in game situations where smaller size offers an advantage.

Strength: The degree of the effect of avatar movements upon objects in the game environment is made inversely proportional to the difference between the player's current momentary physiological signal value and a pre-selected target value for the physiological signal. This ability also affects the force that can be applied through weapons the avatar is manually wielding. This is accomplished by programming the avatar's arms to move with a speed that is inversely proportional to the difference between the player's current momentary physiological signal value and a pre-selected target value for the physiological signal when lifting an object or by programming the number of movements required by the avatar to accomplish a task involving repeated discrete movements to vary in direct proportion to the difference between the player's current momentary physiological signal value and a pre-selected target value.

Stealth: The avatar's opacity as well as the probability of its visibility to other characters in the game is made proportional to the difference between the player's current momentary physiological signal value and a pre-selected target value for the physiological signal.

Flashlight/Illumination: The intensity of a light source emanating from a player's avatar or an object the avatar is wielding is made inversely proportional to the difference between the player's current momentary physiological signal value and a pre-selected target value for the physiological signal.

Weapon Reload Speed: The speed with which an avatar can reload weapons is made inversely proportional to the difference between the player's current momentary physiological signal value and a pre-selected target value for the physiological signal.

Voice Gun (Banshee Ability): The amplitude of the avatar's voice-based weapon and by association the amount of damage it can cause to enemies and objects in the game environment are made inversely proportional to the difference between the player's current momentary physiological signal value and a pre-selected target value for the physiological signal. The Kinect® has built-in microphones which can detect the voice of a player and vocalizations made by the player can be used to control the avatar's voice-based weapon.

Space/Time Warp: The movement of the avatar through the game's environment in both time and space relative to that of enemies is made inversely proportional to the difference between the player's current momentary physiological signal value and a pre-selected target value for the physiological signal.

Other game functions, such as target stickiness and target magnetism can also be modulated. It will be understood that a wide variety of game features and functions can be modulated based on a player's physiological state or states. These functions of the invention can be accomplished by using the physiological signals of the player or the signals of another participant who is not interacting with a videogame motion-sensing controller. Alternately, the physiological signals of a first player can be utilized to modulate the motion-sensing controller of an opposing player.

Some embodiments can also utilize an integrated EMG signal, and a heart rate (cardiotachometer) signal. Some embodiments can utilize brainwave indices, e.g., an "engagement index" derived from brainwave signals, defined in Pope, Bogart and Bartolome Pope, A. T., Bogart, E. H., and Bartolome, D. S. (1995). Biocybernetic System Validates Index of Operator Engagement in Automated Task. *Biological Psychology*, 40, 187-195. Other physiological signals that can be used include, but are not limited to, skin conductance signals, skin temperature signals and respiration signals. The heart rate signal can be derived from a photoplethysmograph sensor or electrocardiogram electrodes. A noise-reducing enhancement can be desired for obtaining an electrical heart signal. One method for obtaining the electrocardiogram heart signal is the use of chest band electrodes in combination with a wireless transmitter (e.g., Polar Model T31 from Polar Electro USA). Such a technology minimizes movement artifact (electrical noise) and enables the invention to be used conveniently with the active and exercise games of video game systems. An additional method for obtaining heart rate data from a player is the use of image analysis capabilities to sense slight changes in skin color (blushing) or temperature which occurs with each heart beat. This allows for unobtrusive (no sensors attached to subject) recording of heart rate.

As discussed above, the present disclosure involves measuring at least one physiological activity. The measured physiological activity can include one or more of autonomically-mediated physiological activity, functional near infrared spectroscopic signals from a brain, transcranial Doppler bloodflow signals from a brain, and/or brainwave electrical activity. In some embodiments the measured physiological activity can also include facial expression patterns for inferring operator state. Any combination of the foregoing physiological activities can be measured. The autonomically-mediated physiological activity can include one or more of a user's skin temperature, skin conductance, galvanic skin response, electrical activity of muscle, blood flow through the user's skin, heart electrical activity, heart rate, heart rate variability, blood pressure, respiratory rate, or combinations of these physiological activities. The brainwave electrical activity can include one or both of event-related electrical brain potentials, and at least one brainwave frequency band. The brainwave frequency band can include at least one of delta band, theta band, alpha band, sensory-motor rhythm (SMR), beta band, gamma band, or combinations of these brainwave frequency bands. In general, the delta band comprises about 0.5 to about 3.5 Hz, the theta band comprises about 4.0 to about 7.0 Hz, the alpha band comprises about 8.0 to about 13.0 Hz, the beta band comprises about 14.0 to about 30.0 Hz, and the gamma band is about 30.0 to about 40.0 Hz. The sensory-motor rhythm (SMR) band is about 12.0 to about 16.0 Hz.

Embodiments of the invention can also employ facial expression recognition as a technology for inferring operator state. This type of embodiment would exploit the capability of a more advanced form of image analysis that could resolve facial expression. This type of embodiment would modulate the functioning of gesture and body movement technology based upon characteristics of operator state derived from signals acquired by image acquisition and analysis hardware and software.

The Kinect® sensors include a color VGA video camera that aids in facial recognition and other detection features by detecting three color components: red, green and blue. This is referred to as a "RGB camera" referring to the color components it detects. The Kinect® sensor also includes a depth sensor comprising an infrared projector and a monochrome CMOS (complimentary metal-oxide semiconductor) sensor that work together to "see" the room in 3D regardless of the lighting conditions. The sensor system also includes a multi-array microphone. This comprises an array of four microphones that can isolate the voices of the players from the noise in the room. This allows a player to be a few feet away from the microphone and still use voice controls.

In operation, the system detects and tracks 48 points on each player's body, mapping them to a digital reproduction of that player's body shape and skeletal structure, including facial details. The system utilizes models representing people of different ages, body types, genders and clothing. The system classifies skeletal movement of each model, emphasizing the joints and distances between those joints.

Thus, there is no separate hand held controller in the Kinect® system. Rather, the video camera, depth sensor, and microphone provide the inputs to the system based on a user's position, movement, and voice.

Figure 2:
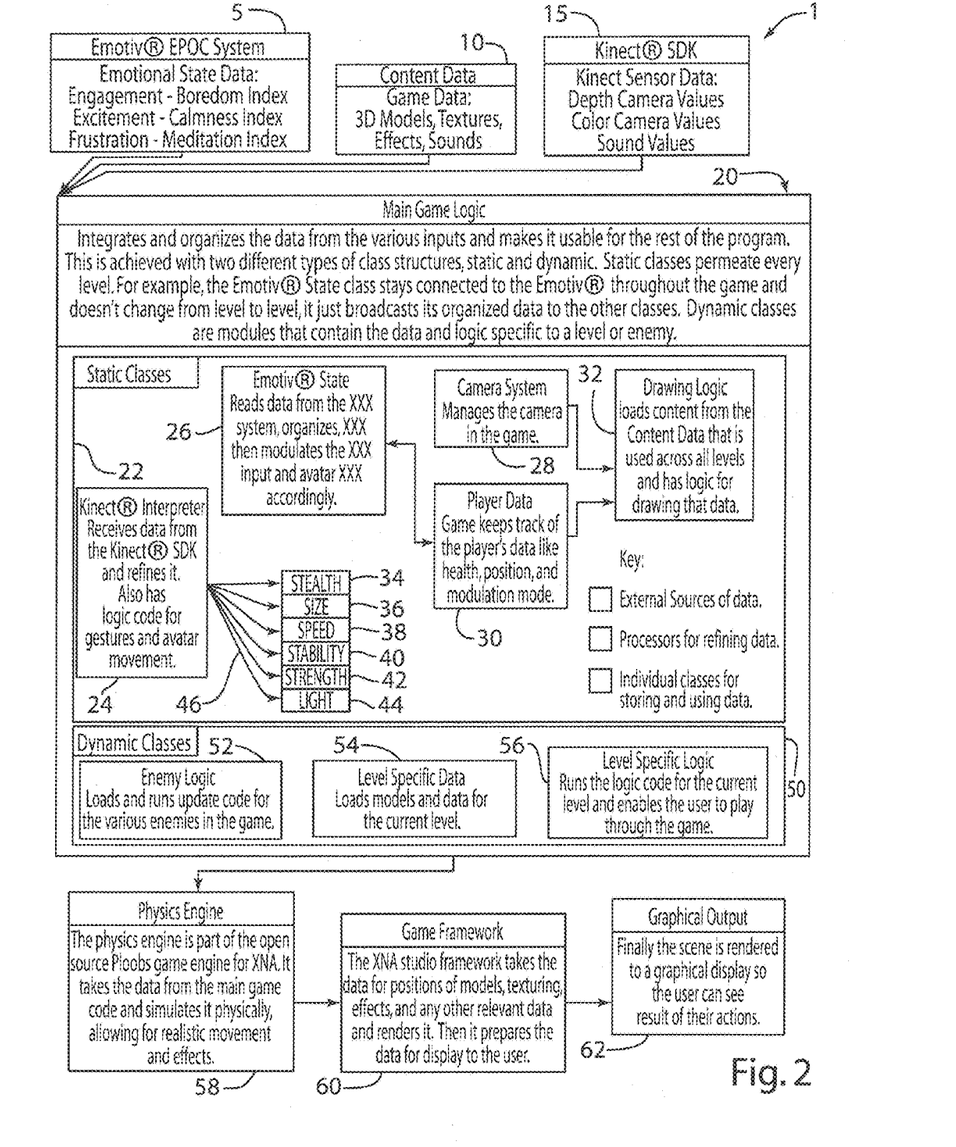
FIG. 2 is a diagram illustrating the components of a system according to a first embodiment of the present invention.

With reference to FIG. 2, a system according to a first embodiment of the present invention includes an Emotiv® EPOC system 5, content data 10, and Kinect® sensor data 15. The data from these three sources is supplied to the main game logic 20. The Emotiv® EPOC system generates affective state or cognitive state data including engagement/boredom, frustration, meditation, and excitement. The Emotiv® EPOC system is commercially available, and the details of the system will not therefore be described in detail herein.

The content data 10 includes game data such as 3D models, textures, effects, and sounds. The Kinect® sensor data 15 comprises depth camera values, color camera values, and sound values. This data may be modified utilizing the Kinect® Software Development Kit (SDK).

The main game logic 20 integrates and organizes the data from the various inputs and makes it useable for the rest of the program. This is achieved with two different types of class structures, namely, static and dynamic class structures. Static classes permeate every level. For example, the Emotiv® State class stays connected to the Emotiv® throughout the game and doesn't change from level to level; it just broadcasts its organized data to the other classes. Dynamic classes are modules that contain the data and logic specific to a level or enemy. The static classes 22 include the Kinect® interpreter 24, Emotiv® State 26, camera system 28, player data 30, and drawing logic 32. Kinect® interpreter 24 receives data from the Kinect® SDK and refines the data. The Kinect® interpreter also has logic capabilities for gestures and avatar movement. The Emotiv® State 26 reads data from the Emotiv® system, organizes the data, then modulates the Kinect® input and avatar accordingly. The Kinect® interpreter 24 provides input 46 concerning the stealth 34, size 36, speed 38, stability 40, strength 42, and light 44 of the avatar. Each of the avatar attributes 34-44 can be modified based on the Emotiv® State of the player.

The camera system 28 manages the camera (player viewpoint) in the game. As illustrated schematically by box 30, the game keeps track of the player's data such as health, position, and modulation mode in the player data "block". The drawing logic 32 loads content from the content data that is used across all levels and has logic for drawing that data. The drawing logic 32 receives input from camera system 28 and player data 30.

The dynamic classes 50 of the main game logic include enemy logic 52, level specific data 54, and level specific logic 56. The enemy logic 52 loads and runs an update code for the various enemies in the game. The level specific data loads models and data for the current level. The level specific logic runs the logic code for the current level and enables the user to play through the game.

A physics engine 58 provides input to the main game logic 20, and to the game framework 60. The physics engine 58 is part of an open source Ploobs game engine for XNA. It takes the data from the main game code and simulates it physically, allowing for realistic movement and effects.

The game framework 60 comprises an XNA studio framework that takes the data for the positions of the models, texturing, effects, and any other relevant data and renders it. It then prepares the data for display to the user.

The game framework 60 provides data to the graphical output 62. The graphical output 62 comprises a scene that is rendered to a graphical display so that the user can see how their actions and mental state are influencing the game environment.

The Emotiv® EPOC and the Microsoft® Kinect® systems provide access to their internal data with software development kits (SDKs). Each system includes a dynamic-link library and a public interface. A videogame software program according to one aspect of the present invention was built linking in both systems and using their respective data to modify code. Access to Emotiv® and Kinect® data was enabled using the public interfaces of the SDKs to instantiate static objects of each class.

The Emotiv® interface allows access to state values and measurements of parameters representing "engagement/boredom," "frustration," "meditation," and "excitement". The Emotiv® object caches a parameter of interest and then uses this value to modulate a videogame parameter. For instance, to capture an index "EngBor" from the Emotiv® interface, the following code:

```
    EngBor = e.emoState.AffectivGetExcitementShortTermScore( );
    enables videogame to make use of this measurement by either affecting videogame
behavior directly or in conjunction with Kinect ® data.
    Emotiv ® data can modify a parameter directly. For instance:
    if (mode = = modeEnum.Size)
    size += (EmotivState.EngBor*3-. If - size) / 38;
    changes the size of the avatar based in part on the "EngBor" index defined previously.
    Emotiv ® and Kinect ® output can be used cooperatively. For example:
    if (Player.mode = = Player.modeEnum.Light && Kinect.tracking)
    PlayerLight.LightPosition = Kinect,NewJointData[3] + Vector3.Up * 10;
    PlayerLight.LightRadius = EmotivState.EngBor * 70;
    Here, if the Kinect ® is actively tracking, and the player mode is appropriate, the
Kinect ® data will control the position of a light beam wielded by the avatar and the Emotiv ®
output will affect the radius of the light beam.
    Additionally, the Emotiv ® data can be used to modulate Kinect ® output directly.
    For instance;
    playerSpeed = (Player.mode = = Player.modeEnum.Speed) ? EmotivState.EngBor *
80) : 25 + Player.size * 10);
    Drawing.Skeletonobj.SkeletonController.speed = -playerSpeed;
    In this example, the speed of the Kinect ® skeleton (avatar) object is proportional to
the player's "EngBor" index, defined previously, or to the size, depending upon the player
mode.
```

A second embodiment makes unnecessary the need for working with a programming language to develop an entire videogame ab initio that incorporates the physiological modulation function. This second embodiment eliminates this programming requirement by employing software application components that translate the outputs of the motion detection and physiological sensing technologies into keyboard commands, the native control language of the game.

The second embodiment makes it possible to physiologically modulate commercial off-the-shelf videogames or simulations by having the Kinect and Emotiv signals input separately by different paths into the game or simulation. The Emotiv signals affect the avatar's capabilities within the game by executing commands that ordinarily are executed by manual keyboard or mouse action. In this way, the effects on the game of the player's movement, captured by the Kinect technology, are modulated within the game.

The functions of positive and negative reinforcement described heretofore can be expressed through the natural mechanics of the game itself. Notably, the player's established rank of a skill in a certain weapon or ability is normally a feature that grows over time through practicing that ability and results in improving the player's competency with that weapon or ability. However, with the second embodiment, the level of a player's rank in a specific skill is tied to certain levels of the player's physiological signals. This form of modulation, while affecting the player's competency in a certain skill, does not actively disrupt signals from the input device, but, rather, indirectly changes the response of the player's avatar to the given circumstance (e.g., a physiologically modulated sword skill will affect how many times the player must cause the avatar to swing the sword to defeat an opponent).

A system according to the second embodiment effects the following modulations of Kinect® functions:

Sword skill: The in-game mechanic titled one handed skill, which affects how much damage the avatar will do to an opponent with one swing of their sword, is made directly proportional to the player's level of excitement as registered by the Emotiv device. Higher levels of excitement result in more damage done to an opponent. This in-game mechanic is modulated in this way in the second embodiment by emulating keyboard commands through the Emokey software and script extenders to the game console during gameplay as described herein.

Archery skill: The in-game mechanic titled archery, which affects how much damage the avatar will do to an opponent with one arrow fired from their bow, is made inversely proportional to the player's level of frustration as registered by the Emotiv device. This will also affect whether the player can or cannot use the zoom-in feature when having the avatar draw an arrow. Higher levels of frustration result in lower levels of damage and potential loss of the ability to zoom-in on a target. This in-game mechanic is modulated in the second embodiment by emulating keyboard commands through the Emokey software and script extenders to the game console during gameplay as described herein.

Sneak skill: The in-game mechanic titled sneak, which affects how well the avatar can remain out of sight when in close proximity to enemies, is made inversely proportional to the player's level of excitement as registered by the Emotiv device. Higher levels of excitement result in the avatar being easier to detect by opponents. This in-game mechanic is modulated in the second embodiment by emulating keyboard commands through the Emokey software and script extenders to the game console during gameplay as described herein.

Magic skill: The in-game mechanic titled destruction, which affects how much damage the avatar will do to an opponent with the flames ability, a stream of damaging fire the avatar can shoot from their hands, is made directly proportional to the player's level of meditation as registered by the Emotiv device. Higher levels of meditation result in more damage done to an opponent. This in-game mechanic is modulated in the second embodiment by emulating keyboard commands through the Emokey software and script extenders to the game console during gameplay as described herein.

Figure 3:
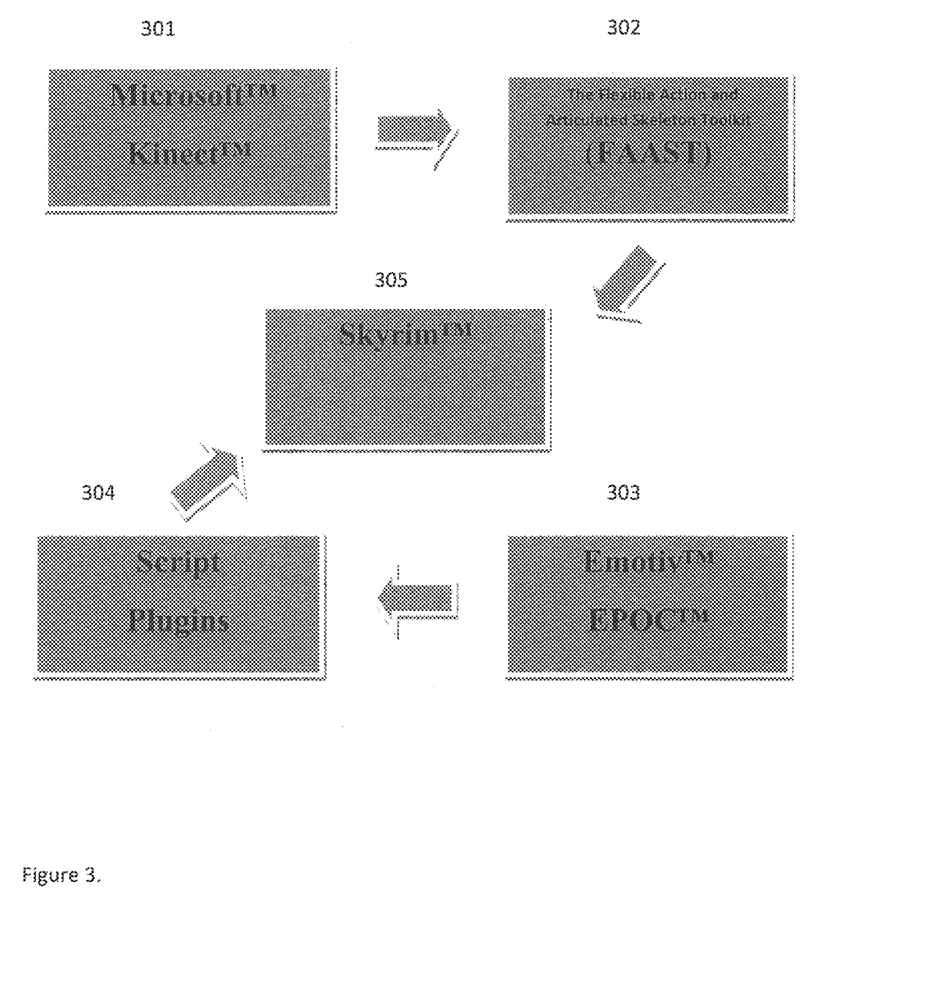
FIG. 3 is a diagram illustrating the components of a system according to a second embodiment of the present invention.

With reference to FIG. 3, a system according to the second embodiment of the present invention includes the following hardware and software components that are configured to implement the innovation in a demonstrative game environment:

1. Microsoft Kinect: An off-the-shelf motion sensing input device 301 that tracks a game player's extremities, specifically their arms, legs, and head as well as torso movements such as leaning or crouching.

2. Flexible Action and Articulated Skeleton Toolkit (FAAST): A software toolkit 302 that translates (binds) motion signals from the Kinect into keyboard commands, i.e. how the game is normally controlled. FAAST can also bind certain hand gestures to mouse control/clicks.

3. Emotiv EPOC EEG Headset: Electroencaphalographic signal sensing and analysis technology 303 that translates EEG signal patterns into several categories of user psychophysiological state: excitement, frustration, meditation, and engagement/boredom. These mental states are graphically displayed by the software and, using Emokey software, selected levels of a state can be assigned to keyboard commands.

4. Script Dragon Skyrim script extenders (plugins): Scripts extenders 304 are bits of code added to the games folders. In the demonstrative game environment, the code responds to the keyboard commands triggered by the EmoKey software. When triggered, these bits of code activate console commands in the game that change the level of the skill of the avatar in using a weapon or ability and thereby change (modulate) the effectiveness of the weapon or ability. Lower skill levels means less damage/effectiveness, and vice versa for higher skill levels.

5. The Elder Scrolls V: Skyrim: A single-player action role-playing open world video game 305 chosen to demonstrate the physiological modulation concept because of its functionality that allows avatar skill level to be changed as described in 4 immediately above.

The player input elements of motion/gesture and psychophysiological state affect the game separately and simultaneously. The player's gestures and movements, sensed by the Kinect 301 and conveyed to the game by FAAST 302, control the movement/attacks of the player's avatar, while the player's psychophysiological state, sensed by the Emotiv headset 303 and conveyed to the game by EmoKey software and Script Dragon Skyrim script extenders 304, controls (modulates) the weapon skill or ability skill of the avatar in the videogame 305.

It is to be understood that variations and modifications can be made on the aforementioned structure without departing from the concepts of the present invention, and further it is to be understood that such concepts are intended to be covered by the following claims unless these claims by their language expressly state otherwise.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "some embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

This written description uses examples to disclose the invention, including the best mode, and also to enable any person skilled in the art to make and use the invention. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of modifying the effects of sensor input from a first sensor system having full-body 3D motion capture of a user's body on an interactive device to encourage self-regulation of at least one physiological activity by the user in a biofeedback process, the interactive device comprising a display area which depicts game or simulation images, an apparatus for receiving at least one input from the first sensor system to thus permit the user to control and interact with at least some of the depicted images, the method for modifying the effects comprising the steps of:

utilizing the full-body 3D motion capture of the first sensor system to provide user input corresponding to at least one of a user's position and movement;

measuring at least one physiological activity of the user utilizing a second sensor comprising a physiological signal sensor to obtain at least one physiological signal indicative of the level of the at least one physiological activity, wherein the at least one physiological activity comprises a physiological process about which a user would not normally be aware;

modifying the effects of the user's input on at least some of depicted game or simulation images by modifying the effects of the input from the first sensor system in response to changes in the at least one physiological signal from the second sensor to provide biofeedback enabling a user to self-regulate physiological activity.

2. The method of claim 1, wherein
at least one of the images comprises a user's avatar that is controlled by the user based on inputs from the 3D sensor system;
at least one of the avatar's abilities is modified to thereby modify the effects of the user's input on the user's avatar.

3. The method of claim 2, wherein the at least one of the avatar's abilities comprises a speed of the avatar's movement.

4. The method of claim 3, wherein the speed of the avatar's movements is inversely proportional or directly proportional to a difference between a user's current momentary physiological signal from the second sensor and a preselected target value for the physiological signal.

5. The method of claim 2, wherein the at least ne of the avatar's abilities comprises a size of the avatar.

6. The method of claim 5, wherein the size of the avatar is inversely proportional or directly proportional to a difference between a user's current momentary physiological signal from the second sensor and a preselected target value for the physiological signal.

7. The method of claim 2, wherein the at least one of the avatar's abilities comprises the movement of the avatar through the display area of the interactive device in both time and space relative to that of at least one enemy.

8. The method of claim 7, wherein the movement of the avatar through the display area of the interactive device in both time and space relative to that of the at least one enemy is made inversely proportional to the difference between the player's current momentary physiological signal from the second sensor and a pre-selected target value for the physiological signal.

9. The method of claim 2, wherein the at least one of the avatar's abilities comprises a steadiness of the avatar's hand or arm.

10. The method of claim 9, wherein the steadiness of the avatar's hand or arm is inversely proportional to the difference between the player's current momentary physiological signal from the second sensor and a pre-selected target value for the physiological signal.

11. The method of claim 2, wherein the at least one of the avatar's abilities comprises an ability of the avatar to grasp an object in the display area of the interactive device.

12. The method of claim 11, wherein the ability of an avatar to grasp an object in the display area of the interactive device is inversely proportional to the difference between the player's current momentary physiological signal from die second sensor and a pre-selected target value for the physiological signal.

13. The method of claim 2, wherein the at least one of the avatar's abilities comprises a degree of the effect of avatar movements upon objects in the display area of the interactive device.

14. The method of claim 13, wherein the degree of the effect of avatar movements upon objects in the display area of the interactive device is inversely proportional to the difference between the player's current momentary physiological signal from the second sensor and a pre-selected target value for the physiological signal.

15. The method of claim 2, wherein the at least one of the avatar's abilities comprises an avatar's opacity and the probability of the avatar being visible to other characters in the display area of the interactive device.

16. The method of claim 15, wherein the avatar's opacity and the probability of the avatar being visible to other characters in the display area of the interactive device is proportional to the difference between the player's current momentary physiological signal from the second sensor and a pre-selected target value for the physiological signal.

17. The method of claim 2, wherein the at least one of the avatar's abilities comprises an intensity of a light source emanating from a player's avatar or an object the avatar is wielding.

18. The method of claim 17, wherein the intensity of a light source emanating from a player's avatar or an object the avatar is wielding is inversely proportional to the difference between the player's current momentary physiological signal from the second sensor and a pre-selected target value for the physiological signal.

19. The method of claim 2, wherein the at least one of the avatar's abilities comprises a speed with which an avatar can reload weapons.

20. The method of claim 19, wherein the speed with which an avatar can reload weapons is inversely proportional to the difference between the player's current momentary physiological signal from the second sensor and a pre-selected target value for the physiological signal.

21. The method of claim 2, wherein the at least one of the avatar's abilities comprises an amplitude of the avatar's voice-based weapon and a corresponding amount of damage the voice-based weapon can cause to enemies and objects in the display area of the interactive device, constituting a game or simulation environment.

22. The method of claim 21, wherein the amplitude of the avatar's voice-based weapon and the corresponding amount of damage it can cause to enemies and objects in the display area of the interactive device are inversely proportional to the difference between the player's current momentary physiological signal from the second sensor and a pre-selected target value for the physiological signal.

23. The method of claim 1, wherein the step of measuring at least one physiological activity comprises measuring at least one of:
    an autonomically-mediated physiological activity;
    a functional near infrared spectroscopic signal from a brain;
    a transcranial Doppler bloodflow signal from a brain; and
    a brainwave electrical activity.

24. The method of claim 23, wherein the autonomically-mediated physiological activity comprises at least one of:
    a) a skin temperature;
    b) a skin conductance;
    c) a galvanic skin response;
    d) a electrical activity of muscle;
    e) a blood flow through the skin;
    f) a heart electrical activity;
    g) a heart rate;
    h) a heart rate variability;
    i) a blood pressure;
    j) a respiratory rate; and
    k) any combination of a)-j).

25. The method of claim 23, wherein the brainwave electrical activity comprises at least one of:
    at least one event-related electrical brain potential; and
    at least one brainwave frequency band.

26. The method of claim 25, wherein at least one brainwave frequency band comprising at least one of:
    a) delta;
    b) theta;
    c) alpha;
    d) sensory-motor rhythm (SMR);
    e) beta;
    f) gamma, and:
    g) any combination of a)-f).

27. The method of claim 1, further comprising utilizing the measured physiological activity of the user from the second sensor to generate an index relating to a user's affective state or cognitive state.

28. The method of claim 27, wherein the user's affective state or cognitive state comprises at least one of a user's engagement/boredom, frustration, meditation, and excitement and wherein the index comprises at least one of an index of at least one of a user's state.

29. An apparatus for modifying the effect of a first sensor system having full body 3D motion capture of a user on an interactive device, the interactive device comprising a display area, or image-generating feature for depicting images upon the display area, constituting a game or simulation environment, and a feature that permits receiving control input from the first sensor system, the control input permitting the user to control and interact with at least some of the depicted images by movement of the user's body to provide control input, the modifying apparatus comprising:
- a second sensor that measures at least one physiological activity of the user, wherein the at least one physiological activity comprises a physiological process about which a user would not normally be aware;
- a converter that converts the at least one measured physiological activity into at least one physiological signal indicative of the level of the at least one physiological activity; and
- a program that modifies the user's control input to the first sensor system in response to changes in the at least one physiological signal from the second sensor, to thus modify the effects of the user's input on at least one of the depicted images in response to changes in the at least one physiological signal to provide biofeedback enabling a user to self-regulate the physiological activity.

30. The modifying apparatus according to claim 29, wherein the interactive device comprises software for controlling the displayed images, the control input comprises control signals, and wherein the modifying apparatus comprises an arrangement to transform the control signals in response to changes in the at least one physiological signal measured by the second sensor prior to the control signals being used by the interactive device software.

31. The modifying apparatus of claim 29 wherein the at least one physiological signal comprises at least one of:
- an autonomically-mediated physiological activity, a functional near infrared spectroscopic signal from brain, a transcranial Doppler bloodflow signal from brain, and a brainwave electrical activity.

32. The modifying apparatus of claim 31 wherein the autonomically-mediated physiological activity comprises at least one of
- a) a skin temperature;
- b) a skin conductance;
- c) a galvanic skin response;
- d) an electrical activity of muscle;
- e) a blood flow through the skin;
- f) a heart electrical activity;
- g) a heart rate;
- h) a heart rate variability;
- i) a blood pressure;
- j) a respiratory rate; and
- k) any combination of a)-j).

33. The modifying apparatus of claim 31 wherein the brainwave electrical activity comprises at least one of:
- event-related electrical brain potentials; and
- at least one brainwave frequency band.

34. The modifying apparatus of cairn 33, wherein the at least one brainwave frequency band comprises at least one of:
- a) delta;
- b) theta;
- c) alpha;
- d) sensory-motor rhythm (SMR);
- e) beta;
- f) gamma; and:
- g) any combination of a)-f).

* * * * *